United States Patent [19]

Vaskunas et al.

[11] 3,793,624
[45] Feb. 19, 1974

[54] POINT OF SALE CREDIT CARD TERMINAL APPARATUS

[75] Inventors: Vygantas A. Vaskunas, Massapequa Park; Howard K. Hager, Nesconset, both of N.Y.

[73] Assignee: Interface Industries, Inc., Hauppauge, N.Y.

[22] Filed: Aug. 19, 1971

[21] Appl. No.: 173,217

[52] U.S. Cl. .......................... 340/149 A, 179/2 DP
[51] Int. Cl. ........................................ H04m 11/06
[58] Field of Search ............... 179/2 DP; 340/149 A

[56] References Cited
UNITED STATES PATENTS

| | | | |
|---|---|---|---|
| 3,610,832 | 10/1971 | Strobel | 179/2 DP |
| 3,614,328 | 10/1971 | McNaughton | 179/2 DP |
| 3,299,210 | 1/1967 | Bandy | 179/2 DP |
| 3,308,238 | 3/1967 | Brothman | 179/2 DP |
| 3,484,694 | 12/1969 | Brothman | 179/2 DP |
| 3,609,248 | 9/1971 | Wolf | 179/2 DP |
| 3,617,638 | 11/1971 | Jochimsen | 179/2 DP |

Primary Examiner—Harold I. Pitts
Attorney, Agent, or Firm—Marn & Jangarathis

[57] ABSTRACT

Point of sale terminal apparatus is provided in accordance with the teachings of the present invention wherein access to a central credit location may be quickly established and once a communication link to such central credit location is established a request for data signal is provided to said point of sale terminal apparatus. The request for data signal is indicated at the point of sale terminal whereupon an operator merely actuates the send button thereat so data from an already inserted credit card, preset sale information print drums and hard wired site or location designators are transmitted to said central location in a clocked logic format. If the sale is authorized on the basis of the data sent, the central location provides an authorized signal which actuates imprinter apparatus at the point of sale terminal apparatus causing the credit card sales form to be automatically imprinted, and the communication link disconnected. However, if the sale may not be automatically authorized the operator at the point of sale terminal may be placed in voice communication with a referral agency. Various overrides are also provided in case of telephone or central location failure.

22 Claims, 3 Drawing Figures

POINT OF SALE CREDIT CARD TERMINAL APPARATUS

This invention relates to point of sale data terminals and more particularly to remotely located data terminals wherein data associated with a credit card sale is collected and transmitted to a central computer or referral agency for presale authorization prior to the consummation of the sale and the associated imprinting of the credit sales form.

The wide proliferation of credit cards among the buying public as a whole together with the emergence of conditions wherein large and small retailers and service establishments often accept several forms of credit cards issued by banks or other large nationally affiliated organizations not otherwise associated with the locations accepting their credit cards has rendered manifest the need for integrated credit sale systems enabling each credit card sale transacted to be quickly authorized on the basis of the current status of that account prior to the consummation of the sale and a rapid updating of that account to reflect that sale. This view is taken because widespread trafficking in stolen or counterfeit credit cards together with the mass mailing of unrequested credit cards by large institutions seeking to place their form of credit card in wide use has resulted in conditions wherein losses due to the unauthorized use of credit cards have become quite substantial and now represent a substantial cost factor which threatens the credit card industry.

The attributes required of such an integrated credit sales system are such that credit card account sales and point of sale information must quickly and easily be transmitted to a central location having access to the current status of the credit card account then being utilized and capable of inspecting the status of such account to determine whether or not a sale in question should be authorized. This determination of whether or not the sale is to be authorized will ordinarily take the form of merely comparing the current credit extended with the sale in question included therein against the total credit authorized in the account; however, factors related to the account's history such as past buying habits, the amount of previous individual sales, use at the inquiring location or those closely related in geographical area thereto and etc. may also be inquired into to ascertain whether or not the sale fits a previously established buying pattern associated with that account. A further element to be checked in each case is whether or not the credit card being proffered has been reported stolen or lost and in this regard it should be noted that while a central location may be notified as to these types of credit card losses as soon as the credit card issuer is notified by the credit card holder, it often takes about a week for independent sales and service establishments to be individually notified under the mailed list of suspect cards technique currently employed by most credit card issuers and it is druing this week that most fraudulent sales occur. Once it is determined whether or not the sale is to be authorized the inquiring location should be notified and if such sale is not centrally authorized and the sale is accepted by the remote location; the credit card sales form should be plainly imprinted to indicate that should loss occur, the sales location is to stand the loss. Additionally, in doubtful cases of authorization, such as when the sale in question will only extend the account slightly past its authorized limit as a result of several previous sales which fit an established pattern; the determination of presale authorization should be referred at the central location to a supervisor or referral agency which may exercise discretion in this area.

The point of sale credit card terminal in such an integrated system must have the attributes of being small in size so as not to impair available selling or counter space at the sale or service establishment using the terminal, it must be capable of supplying all of the requisite data from a single integrated unit so that partial transmissions will not result from inexperienced users provided with several interconnected units which are not interlocked, and it should be simple to operate and preferably have self-teaching features so that an inexperienced user may be quickly and easily trained in its use. Furthermore, as such point of sale credit card terminals will be selectively linked to remote central computers or referral agencies through telephone lines or the like, it is imperative that the mode of operation thereof be such that access to such central computers be quickly established and thereafter the appropriate data be quickly provided so that undue sales terminal operator time and/or machine time is not expended.

Therefore it is a principal object of this invention to provide improved point of sale terminal apparatus for interrogating a central location with respect to a credit card sale and providing sufficient data thereto so that presale authorization may be obtained therefrom if such authorization is warranted. Various other objects and advantages of the present invention will become clear from the following detailed description of an exemplary embodiment thereof, and the novel features will be particularly pointed out in conjunction with the appended claims.

In accordance with the teachings of the present invention, point of sale terminal apparatus is provided wherein access to a central credit location may be quickly established and once a communications link to such central credit location is established a request for data signal is provided to said point of sale terminal apparatus; the request for data signal is indicated at said point of sale terminal whereupon an operator merely actuates the send means thereon so data from an already inserted credit card, preset sale information print drums and hard wired site or location designators are transmitted to said central location in clocked logic format; if the sale is authorized on the basis of the data sent, the central location provides an authorized signal which may actuate powered imprinter means at the point of sale terminal apparatus causing the credit card sales form to be automatically imprinted, and the communications link disconnected, however, if the sale may not be automatically authorized the operator at the point of sale terminal may be placed in voice communication with a referral agency; various overrides are also provided in case of telephone or central location failure.

The invention will be more clearly understood by reference to the following detailed description of an exemplary embodiment thereof in conjunction with the accompanying drawings in which.

Figure 1:
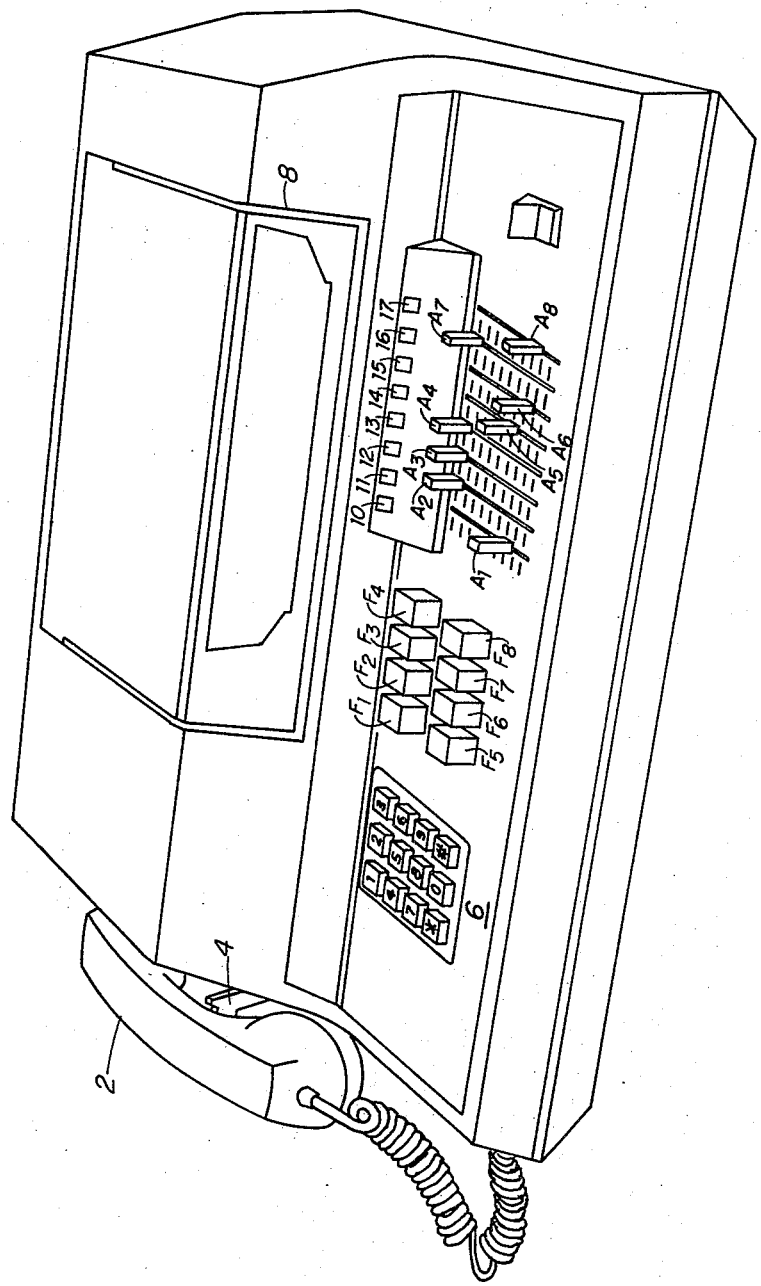
FIG. 1 is a pictorial view of exemplary point of sale terminal apparatus according to the present invention.
Figure 2:
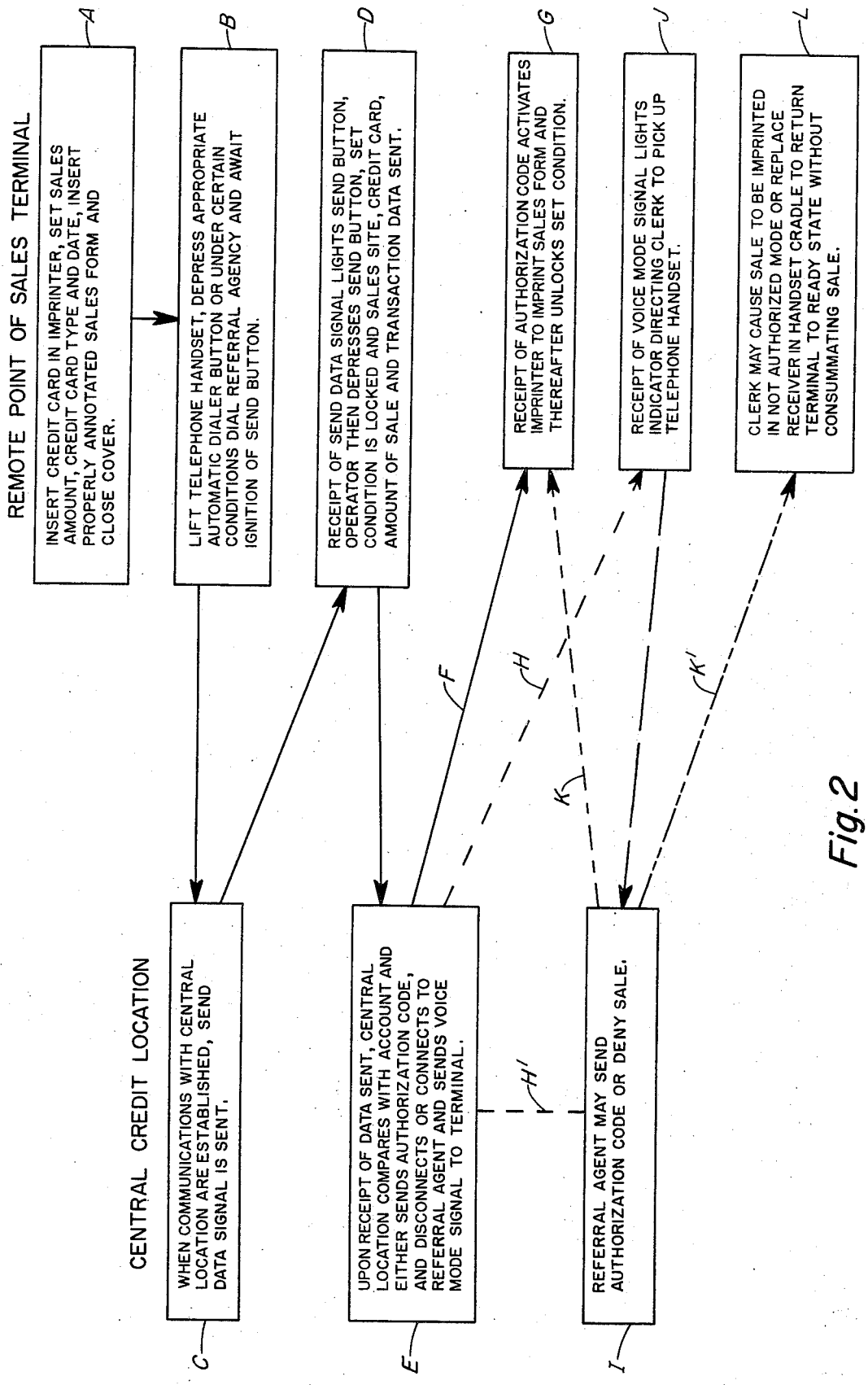
FIG. 2 is a flow diagram of the basic operational characteristics of the exemplary point of sale terminal apparatus according to the present invention.

Referring now to the drawings and more particularly to FIG. 1 thereof, the basic features of an exemplary housing for the point of sale terminal apparatus according to the present invention will initially be described so that the manner in which certain operational steps indicated in the flow diagram of FIG. 2 are implemented, will be appreciated. Thereafter the basic operational characteristics of the exemplary point of sale terminal apparatus of the instant invention will be described in conjunction with the flow diagram of FIG. 2 and subsequently the structure and operation of an exemplary embodiment thereof will be described in conjunction with schematic block diagram thereof shown in FIG. 3. As shown in FIG. 1, the exemplary housing for the point of sale terminal apparatus according to the present invention comprises a telephone handset 2, a cradle 4 therefor, a touch tone pad 6, a plurality of slide switches $A_1$-$A_8$, a plurality of function buttons $F_1$-$F_8$ and compartment 8 which as will be explained subsequently contains a magnetic stripe reader and a powered imprinter (not shown). The telephone handset 2 and the touch-tone pad 6 are conventional and are available as a part of a standard ITT touch-tone telephone which, as shall be seen below, is directly incorporated into the exemplary point of sale terminal apparatus according to the present invention. It should be noted, however, that the point of sale terminal apparatus contemplated herein, provides automatic dialing features in either the touch-tone or rotary mode and hence the touch-tone pad 6 is primarily employed for data transmission associated with nonreadable credit cards rather than being used for establishing a communications link to a central station or referral agency. The handset cradle 4 is conventional except, for reasons which shall become apparent below, when the telephone handset is lifted and an automatic dialing mode initiated, the handset cradle 4 contacts may be internally bypassed so that the telephone handset 2 may be replaced in the cradle 4 without disconnecting the point of sale terminal apparatus from the communications link being established. The telephone handset cradle 4 also acts in its unbypassed condition, when depressed by the telephone handset 2, to clear and ground the various logic components present in the point of sale terminal apparatus according to the present invention and hence at the completion of a cycle of operation, a disconnect sequence initiated remotely from the point of sale terminal apparatus will restore the contacts of the handset cradle 4 to an unbypassed mode so that it acts to clear and ground the point of sale terminal apparatus for a subsequent cycle of operation.

The slide switches $A_1$-$A_8$ serve to set manually settable imprinter drums or wheels which are located in the compartment 8 and the indicator drums 10-17 therefor which are located in plain view on the housing and provide an operator with a viewable indication as to the values to which the imprinter drums are set. The imprinter drums are of the kind described in U.S. Pat. No. 3,702,097, filed on equal date herewith having raised character thereon which when set by the associated slide switch $A_1$-$A_8$ therefor will act to imprint an overlying credit card sales slip with the character set when a roller bar is passed thereover. The slide switches $A_1$-$A_8$ are each settable with the characters 0-9 on each of the imprinter drums associated therewith, and certain of said slide switches are electrically readable by terminal logic; the slide switches $A_1$-$A_8$, the indicator drums and the imprinter drums being commercially available from The Digitran Corporation. The imprinter drums within compartment 8 are each selectively lockable upon a command signal in the manner disclosed in the aforesaid U.S. Pat. No. 3,702,097, and form a part of the powered imprinter apparatus described generally in U.S. application Ser. No. 173,017 filed on equal date herewith, and U.S. Pat. No. 3,702,097 other forms of powered imprinter apparatus may be employed.

Although not shown in FIG. 1, the compartment 8 includes a magnetic stripe credit card reader of the type disclosed in U.S. application Nos. 173,218 and 173,018 filed on equal date herewith and powered imprinter apparatus of the type described in the aforesaid U.S. Application No. 173,017 and U.S. Pat. No. 3,702,097. For the purposes of the instant application, the magnetic stripe credit card reader may be considered to be a device capable of deriving properly timed data from magnetic stripe credit cards recorded according to a double frequency recording technique and providing the properly timed data obtained therefrom at a rate of approximately 10 characters per second so that such data may be directly employed with normaly telephone circuits without extensive buffering. It should be noted in this regard that the instant invention may accept credit cards which are embossed with a magnetic stripe or those of the more usual variety not having a magnetic stripe thereon; it being noted that the magnetic stripe credit card reader is employed for the former type of embossed credit card while the touch-tone pad 6 is employed to manually encode the account number from a non-embossed credit card. Similarly, for the purposes of this disclosure, the powered imprinter enclosed within the compartment 8 may be considered to take the usual form of a flat base plate member having an identification plate thereon which sets forth the location of the powered imprinter or point of sale terminal and any other appropriate information, which is fixed in character, associated with the sales location to be credited with the sale. The flat base plate member additionally has a portion thereof devoted to receiving a credit card and an apertured section through which raised characters on a plurality of print drums protrude. The print drums are set by slide switches $A_1$-$A_8$ for the amount of the sale and other appropriate information which may be desired, as set forth below; and the area of the flat base plate occupied by the identification plate, the credit card and the apertured section through which the raised characters on the plurality of print drums protrude is such that a credit card sales form or similar other forms may be placed in an overlying relationship therewith so that the portions hereof adapted to receive location, credit-card and sale and other print drum information are in appropriate registration with the raised indicia therefor on the flat base plate. Thus, when a roller bar or other appropriate pressure imposing member is rolled over the surface of a credit card sales form in place on the flat base plate, location, credit-card sales information, etc. will be imprinted thereon in the well-known manner. The imprint signal actuating the sweep of the roller bar, is here provided by a central location with which the point of sale terminal apparatus communicates and this signal, as shall be seen below, is only provided when the sale is to be authorized. Additionally, a manual override is provided to energize the roller bar by one of the function buttons $F_1$-$F_8$; however, when this override is employed, the credit card sales slip is clearly encoded with an unauthorized mode character indicating that in case of loss, the responsibility for the sale must be born by the selling location rather than the credit card issuer.

The slide switch $A_1$ is for indicating the credit card type employed and acts to set an imprinter drum within the powered imprinter so that the sales form produced always indicates the credit card type via a reference numeral. If it is assumed for the pruposes of the instant disclosure that nine specified types of credit card are to be accommodated, i.e., Bank Americard, Master Card, etc., slide switches 0-8 may indicate respectively, the nine credit cards accommodated while the 9 position is for use with credit cards which are not specifically accommodated by the terminal. The slide switches $A_2$-$A_8$ for setting the amount of the sale and act to set appropriate imprinter drums within the powered imprinter. The setting of switches $A_1$-$A_8$ are electrically readable. Furthermore, though not shown herein, ten additional print drums are present within the powered imprinter section of the point of sale terminal apparatus according to the present invention. Six of these print drums are operator settable within compartment 8 and provide date information. Three more of such print drums may be considered to be driven by a mechanical counter or the like, are machine readable in the same manner described for slide switches $A_1$-$A_8$ and serve to provide a running count of the transaction number which like the date information is imprinted onto the credit card sale form. The last of these additional print drums constitutes an authorized or unauthorized code drum and differs from the other print drums present in the powered imprinter in that only two raised characters rather than ten are present thereon wherein one character indicates an authorized sale while the other indicates an unauthorized sale. The authorized sale indicator may be considered to be normally in place while the unauthorized indicator is set whenever the mechanical override is actuated; however, other modes of operation are available such as the control of this print drum from the central station being contacted. The credit card sales form thus produced by the powered imprinter within compartment 8 thereby provides site information from the flat merchant's indentification plate, the credit card number obtained from the credit card itself and any other information characters such as the credit card holder's name and the information provided by the raised characters on the print drums which may be set forth in an OCR Row with the credit card number and are briefly summarized as follows:

Date — Manually settable print wheels or drums (6 characters)
Card Type — Slide switch operated print wheel or drum, whose position is electrically readable by the terminal logic (1 character)
Amount — Slide switch operated print wheels or drums, whose position is electrically readable by the terminal logic (7 characters)
Authorization Code — Solenoid operated print wheel or drum, under direction of the terminal logic (1 character)
Transaction Code — Mechaical counter which is acutated at each imprinting operation, and whose position is electrically readable by the terminal logic (3 characters).

The nature and function of the function buttons $F_1$-$F_8$ illustrated in FIG. 1 will be described below in conjunction with FIGS. 2 and 3.

FIG. 2 is a flow diagram of the basic operational characteristics of the exemplary point of sale terminal apparatus according to the present invention and serves to illustrate a basic cycle of operation thereof. As indicated in block A of FIG. 2, when a clerk or other sales person is presented with a credit card for the purchase of goods or services such person will make out a credit card sales form in the conventional manner, i.e., description of the goods or services, item price and total etc. and have the card holder sign such credit sales form as is conventionally done. Thereafter, slide switch $A_1$ is set for the appropriate credit card type, i.e., American Express or the like, the amount of the sale is set on slide switches $A_2$-$A_8$ and the date will be set on the appropriate six print drums within compartment 8 unless they have already been set for that day. The credit card is then placed within the compartment 8 as is the properly annotated sales form, it being noted that sales form is placed in the powered imprinter portion of the compartment 8 so as to overlie the sales location identification plate, the raised portions of the credit card and the properly set print drums. The cover to the compartment 8 is then closed so that interlocks associated therewith are placed in an enabled condition.

When the point of sale terminal apparatus is loaded in the manner indicated by block A, the clerk, as indicated by block B, lifts the telephone handset 2 and depresses the appropriate automatic dialer button or under certain conditions dials a special referral agency. As shall be seen below, the terminal apparatus according to this invention is provided with automatic dialing for connecting with a central computer associated with the credit cards normally employed therewith, i.e., settings 0-8 of slide switch $A_1$, and automatic dialing for connecting with a referral agency for such cards and hence manual dialing would only be employed when neither location would suffice, i.e., a credit card not handled by either location or when all of the locations which may be autodialed are unavailable due to a breakdown in the telephone systems associated therewith. Similarly, the autodial feature to a referral agency is only employed with a credit card not handled by the computer location, or when the computer location breaks down or for some other reason the computer location is unavailable. Here, however, it may be assumed that a credit card is presented which is handled by the computer location and hence the $F_1$ dial function button is depressed. When this automatic dialing button is depressed, the cradle 4 contacts may be bypassed, as aforesaid, whereupon the clerk may hang up and the central computer location is contacted through a link established through either a rotary or touch-tone dialing mode as required by the telephone system associated with the terminal site. It should be further noted that although a single central computer location and referral agency is contemplated for all the credit cards that the instant terminal apparatus is to handle, separate locations for each credit card issuer accommodated could be employed and in this regard the credit card designating slide switch $A_1$ would operate in conjunction with the automatic dialing feature of the instant invention to provide the appropriate dialing code.

After the central computer location is called in this manner, the terminal remains in its previous state until the computer is placed on the line. This state of waiting may be indicated by automatic dialing function button $A_1$ remaining in a lighted condition which was established when it was depressed. When the central computer gets on the line, as indicated by block C, a send data signal is sent by the computer to the inquiring point of sale terminal through the telephone link established. This send data signal as well known to those of ordinary skill in the art may take the form of the answering tone from the remote MODEM at the computer location or alternately an independent two-tone, touch-tone code may be employed. The send data signal produced by the central computer location and sent to the inquiring point of sale terminal apparatus, as indicated in block D, is detected by a tuned circuit detector therein and employed to illuminate the send function button $F_5$. When the send function button $F_5$ is illuminated, the clerk at the terminal location depresses this button whereupon site identification data (5 characters), type of credit card data (1 character), card account number data (either as read from a magnetic stripe or punched in at the touch-tone pad 6), sale amount data (7 characters), transaction data (3 characters) and end of transmission data (1 character) are sent by the terminal apparatus as indicated by block D to the central location via the telephone link established in the form of clocked data. The manner in which this transmission takes place will be explained in conjunction with FIG. 3; however, it should be noted when card information must be punched in at touch-tone pad 6, as indicated by the setting of the credit card type switch, the failure of magnetic stripe card reader to read a valid start of data bit and/or the clerk's depression of function button $F_3$ upon noticing that no magnetic stripe is on the credit card; function button $F_3$ is lighted and transmission is stopped until appropriate credit card account information is entered via the touch-tone pad 6.

The data sent to the central computer, as indicated by block E, is evaluated thereat and a determination is made that the sale may or may not be authorized. If the sale is to be authorized, an authorization code, as indicated by the solid arrow is sent to the point of sale terminal and as indicated by block G such authorization code is detected and utilized to energize the imprinter whereupon the credit sale is consummated and the communications link disconnected. However, if the sale may not be approved the computer station sends a voice mode signal indicated by the dashed arrow to the terminal apparatus and transfers the communications link established to a referral agent as indicated by the dashed arrow H' and the block F. Upon receipt of the voice mode signal at the point of sale terminal, as indicated by the block J, the reference switch indicator button $F_6$ is illuminated, which directs the clerk to pick up the handset so that direct voice communication with the referral agent is obtained. If the sale is to be approved by the referral agent, such as under conditions wherein the instant sale represents a minor overdraw or further identification is required prior to authorization, the referral agent apprises the clerk of the appropriate facts so that the card holder may be advised of the status of his account or further questioned and any further information which may be necessary can be communicated to the referral agent. Thereafter the referral agent may manually send an authorization code as indicated by dashed arrow K which results in the energization of the imprinter thereby imprinting the sales form and consummating the sale whereupon the communications link is disabled. If, however, the referral agent determines that the sale is not to be approved, the referral agent may apprise the clerk of this fact, as indicated by the arrow K'. The clerk may then hang up, as indicated by block L, requesting the card holder to go to the credit office so that the difficulty may be further considered or under special circumstances seek out a local supervisor to inquire as to whether or not the selling location wishes to accept the sale on its own initiative such as when the card holder rates special consideration at the sales location. If such local authorization is not approved, no further action need be taken; however, if local action is approved, the clerk may depress the manual imprint button $F_8$ which causes the authorization code indicator to flip to its unauthorized state and the imprinter roller to be actuated whereby the sales form is imprinted with an indication of local authorization. In this sale mode, should the credit card sale not be properly honored by the card holder, the local selling site must bear the loss rather than the credit card issuing organization.

Thus it will be seen that the point of sale terminal apparatus according to the present invention may be incorporated in an integrated credit card sales system providing a remote location with the current status of individual credit card accounts accommodated thereby. Furthermore, the automatic dialing, clocked data flow and self-teaching features of the instant invention insure that undue machine or sales time need not be devoted to the use of the point of sale terminal apparatus according to the present invention while sales personnel may be quickly and easily taught to operate the point of sale terminal apparatus taught herein.

Figure 3:
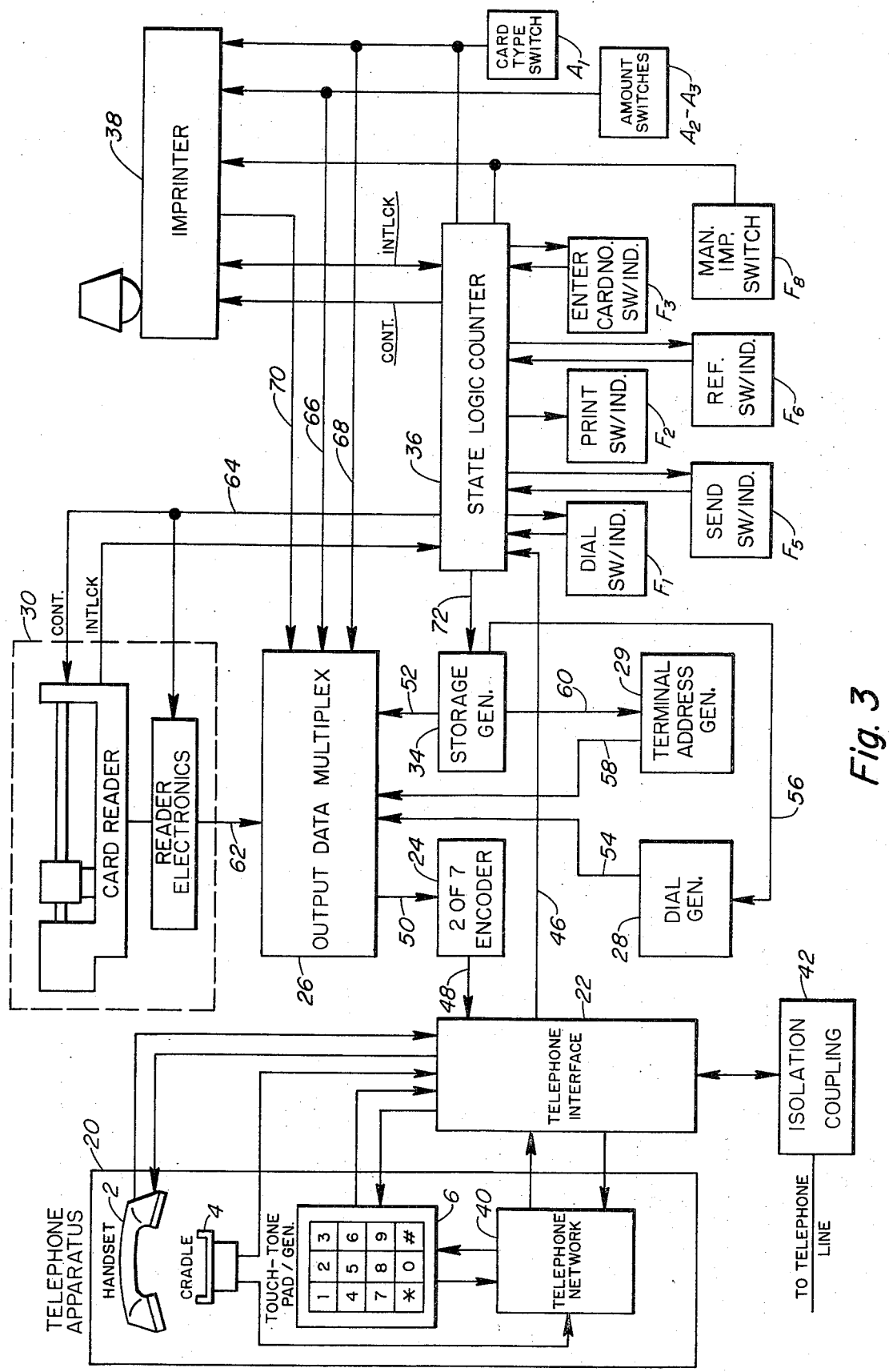
FIG. 3 is a simplified block diagram schematically illustrating an exemplary embodiment of the point of sale terminal apparatus according to the present invention.

FIG. 3 is a simplified block diagram which schematically illustrates exemplary structure for an embodiment of the point of the sale terminal apparatus according to the present invention. The exemplary point of sale terminal apparatus shown in FIG. 3 comprises telephone apparatus indicated by the block 20, telephone interface means 22, encoder means 24, multiplex means 26, the logical input means 28–30 for the multiplex means 26, strobe generator means 34, counter means 36 and imprinter means 38. The telephone apparatus indicated within the block 20 includes a handset 2, a cradle 4, a touch-tone pad 6, all as were described in conjunction with FIG. 1 and a telephone network 40. The handset 2, cradle 4, touch-tone pad 6 and network 40 are all conventional and are provided as standard components in a touch-tone telephone such as the ITT series K2500 touch-tone telephone with the single exception that a structurally modified cradle for use with the exemplary housing depicted in FIG. 1 is employed. The telephone network 40 corresponds to the electronics normally employed in telephone apparatus of the foregoing type and the interconnections illustrated between the touch-tone pad 6, the cradle 4 and the telephone network 40 are the same as those normally relied upon in such telephone apparatus. The telephone interface 22 comprises a relay matrix or array and power supply which performs four discrete functions within the instant embodiment of the present invention. In the normal usage of telephone apparatus, power therefor is provided through the telephone lines; however, data terminals such as those here under discussion must be isolated from the telephone line by standard CBT or CBS couplers which are provided by the telephone company and hence power must be supplied to the telphone apparatus as indicated by the dashed block 20. Accordingly, the telephone interface 22 supplies such power in the form of a conventional supply connected to the telephone network 40, as indicated in FIG. 3, through a serial connection resembling a power series teletype loop. Additionally, as shall be seen below, the telephone interface 22 must respond to electrical signals provided thereto by the encoder means 24 to cause the generation of touch-tone frequencies in the same manner as the touch-tone pad 6. For this purpose, the telephone interface 22 is provided with a relay array wherein each relay parallels one of the contacts on the touch-tone pad 6. In this manner each time an appropriate pair of such relays is energized by an output from the encoder means 24, a touch-tone frequency pair is generated by the generator portion of the touch-tone pad 6 and telephone network 40 in the same manner as if a button on the touch-tone pad 6 was depressed. Further, an additional relay in the telephone interface 22 is provided to disable the manual use of touch-tone pad 6 whenever the relay array in the telephone interface 22 is being employed while a second relay may be provided to bypass the cradle 4 contacts whenever such relay array is initially energized so that the handset 2 may be replaced on the cradle 4 once operation of the instant invention is initiated. The handset 2 and cradle 4 are also connnected, as indicated in FIG. 3, through the telephone interface 22 so that access to the telephone line therethrough is obtained while the telephone interface 22 is connected through a conventional isolation coupling 42 of the standard CBT or CBS type to a telephone line as indicated. A data output of the telphone interface 22 is connected through conductor 46 to the counter means 36 while a data input to the relay array thereof is connected to encoder means 24 through conductor 48.

The encoder means 24 comprises a conventional two of seven (2 of 7) touch-tone encoder which may be formed by an array of four input NAND gates arranged for touch-tone conversion. The encoder means 24 acts in the well-known manner in response to a decimal input (one of ten) applied thereto from the multiplex means 26 to provide a two frequency touch-tone signal from the seven frequency signals available therein. The output of the encoder means 24 is connected, as aforesaid, through conductor 48 to telephone interface 22 while a series of decimal data inputs thereto are applied from multiplex means 26 through conductor 50 which may be considered to take the form of a ten conductor cable.

The multiplex means 26 takes the form of a conventional gated dial arrangement which acts in the well-known manner to channel various inputs applied thereto to the output thereof in a properly timed sequence. As shall be seen below, each of the inputs to the multiplex means 26 is provided in decimal form and hence these are merely channeled to the output thereof at conductor 50 in a timed sequence determined by the strobe generator means 34 and the state of the terminal. The strobe generator means 34 is connected to the timing input of multiplex means 26 through conductor 52 and acts merely to step the gated dial arrangement thereof among the data inputs applied thereto. Decimal data inputs are applied to the multiplex means 26 from the dial generator means 28, the terminal address generator means 29, the magnetic stripe reader 30, the amount switches $A_2$–$A_8$, the card type switch $A_1$ and the transaction counter in the imprinter 38. The dial generator means 28 may comprise two sets of ten AND gates which are each commercially available in programmable modula form. Each set of ten (10) and gates provide ten output lines wherein one of such output lines is enabled to provide a decimal output for each input applied thereto and program pins are provided so that the decimal output produced for each input pulse received may be varied by the pin positions. As shall be seen below, up to sixteen pulse inputs may be provided on parallel conductors to one or the other of the two sets of AND gates depending upon the mode of dialing selected and each pulse so applied acts to provide a desired decimal output, it being noted that the last pulse so applied acts not only to produce a decimal output but is also relied upon to reset the counter means 36. One of the two sets of ten AND gates within the dial generator means 28 is relied upon for automatic dialing of the central computer location while the second set of ten AND gates therein is utilized in the automatic dialing of the referral agency. The number of inputs utilized for each set of ten AND gates is strictly a function of the number of digits needed to establish communications with the referral agency and the remote computer. For instance, if a straight local call technique were employed seven inputs to thereby obtain seven output digits for application through the ten conductor cable 54 would be employed. Similarly, if an area code was involved ten inputs would be employed while if access codes were also involved additional inputs could be employed. While only two sets of ten AND gates are here employed. As a single computer location and referral agency for all credit cards accommodated is contemplated, it will be appreciated that additional AND gate sets could be incorporated herein and selectively actuated by card type select switch $A_1$ when one location does not serve all of the credit cards accommodated. The pulse inputs to the dial generator means 28 are provided thereto through the multi-conductor cable 56 from the strobe pulse generator means 34 which is described subsequently. Here, however, it is only necessary to note that the multi-conductor cable 56 includes one conductor for each input pulse supplied to each of the two sets of ten AND gates present in the dial generator means 28.

The terminal address generator means 29 provides another input to the multiplex means 26 in the form of five bits applied in decimal form thereto via a 10 conductor cable 58. The terminal address generator means 29 may take the form of a conventional program card which is hard wired into the terminal but is field changeable and provides a predetermined five bit decimal output representing the sending terminal site on the ten output lines thereof, one output being produced for each input received. The predetermined five bit decimal output representing the sending terminal site is determined by the manner in which the program card is wired and the five input pulses applied thereto to generate this code is applied from the strobe generator means 34 via the five conductor cable 60. Although a predetermined fine bit decimal code is here contemplated it will be apparent that such code could be extended, for example a ten bit code, for use in large integrated credit card systems. As shall be seen below, while the dial generator means 28 is activated as an independent sequence, the terminal address generator means 29 is activated as the first five bits in the send data sequence mentioned above in conjunction with FIG. 2.

The magnetic stripe credit card reader 30 provides another series of decimal inputs to the multiplex means 26 through the ten conductor cable 62. The magnetic stripe credit card reader 30 may take the same form as the reader apparatus disclosed in our copending application Ser. No. 173,018 filed on equal date herewith with the single exception that the output thereof in binary form is converted to decimal form through the use of any conventional form of binary-to-decimal converter apparatus. For the purposes of the instant application, however, it is sufficineent to appreciate that at least account number information is read from a magnetic stripe on a credit card by the reader 30 when the same is enabled by a control level on conductor 64 and applied in decimal form to the multiplex means 26 via the 10 conductor cable 62. It should be noted that when magnetic stripe credit cards are not employed, credit card account number information is manually punched in by the clerk on the touch-tone pad 6 in response to the illumination of function button $F_3$. The data punched in at touch-tone pad 6 need not be applied to the multiplex means 26 and the encoder means 24 as the touch-tone pad 6 generates touch-tone codes directly. The account number information is associated with the send sequence and it should be additionally noted that although separate credit card reader apparatus 30 and imprinter apparatus 38 have been shown in FIG. 3, they are closely associated with each other so that one side of the credit card may be magnetically read while the other is employed for imprinting.

The setting of card type switch $A_1$, the amount switches $A_2-A_8$ and the transaction print drums (3 characters) present in the imprinter means 38 are each electrically readable in the conventional manner, as aforesaid, and the settings thereof are provided in decimal form as further inputs to the multiplex means 26 via multi-conductor cables 66, 68 and 70, respectively; wherein card type switch $A_1$ provides a single decimal input, the amount switches $A_2-A_8$ provide seven decimal inputs and the transaction print drums provide three decimal inputs all of which represent the settings associated therewith. Each of these inputs to the multiplex means 26 is provided as part of the send data sequence.

The counter means 36 functions as a state logic counter in that it serves to both clock data through the system at a predetermined rate and to set the state of the system so that proper sequencing is obtained therefor. The state logic counter 36 may take the form of a seventeen stage flip-flop shift register having the first sixteen stages thereof connected in a ring counter configuration (or a binary counter with binary-to-decimal decoder) and a four stage counter serving to selectively gate the parallel outputs of the seventeen stage shift register configuration through AND gates connected to the parallel outputs of said shift register and selectively enabled thereby. Each stage of the four stage counter corresponds to one mode of operation of the terminal, i.e., dial computer, dial referral agency, send data and imprint, and controls the application of the parallel outputs of the seventeen stage shift register configuration which goes through a full or partial shifting sequence for each mode except for the imprint mode and then is cleared. Each of the stages of the four stage counter is set by one of the function buttons associated therewith, i.e., $F_1$, $F_6$ and $F_5$ except for the imprint stage which may be set either by the manual imprint switch $F_8$ or an imprint tone sent from a remote computer or referral location. The send data and dial referral agency stages may also be set upon recipt of control pulses from the remote computer; however, the stage in the counter associated therewith is merely set so that the function button is illuminated for operator instruction but sequencing due to the action of the shift register is not initiated. Outputs and inputs to each of the function buttons $F_1-F_3$, $F_5$, $F_6$ and $F_8$ as indicated in FIG. 3 are provided from counter means 36 so that each button may be illuminated for operator instruction and each stage of the four stage counter set. Additionally, control levels and interlock signals are provided between the state logic means 36, the card reader 30, and the imprinter means 38 so that appropriate start and interlocking levels may be established during the operation thereof as will be described hereinafter. A double interlock is indicated between the imprinter means 38 and the state logic counter 36 because the state logic counter is interlocked so it may not change modes once the imprinter means 38 is energized and the print drums of the imprinter are locked in the manner taught in U.S. Pat. No. 3,702,097 once a send sequence is initiated. The output levels associated with each of the flip-flops in the seventeen stage shift register means and the four stage counter means in the state logic counter 36 are applied to the strobe generator means 34 through multi-conductor cable 72 while decoded control tones received from a remote location are applied thereto via cable 46. Although only a seventeen stage shift register has been specified it will be readily appreciated by those of ordinary skill in the art that larger data sequences may be obtained with larger shift registers.

The strobe generator means 34 performs the function of a data control in that it produces a strobe pulse for each output level produced by the seventeen stage shift register in the stage logic counter 36 and applies each strobe pulse thereby produced through conductor 52 to the multiplex means 26 as the clocking or stepping pulses therefor. The strobe pulses produced by the strobe generator means 34 may be produced by any well-known form of generator means which responds to input signals applied thereto or alternately the levels of the seventeen stage shift register may be directly employed. Additionally, the strobe pulses produced in response to the shifting of the seventeen stage shift register means in state logic counter 36 are selectively applied as inputs to one of the two sets of ten AND gates in the dial generator means 28 through cable 56 or the first five strobe pulses are applied to the terminal address generator means 29 through cable 60. This is accomplished by an AND gate array within the strobe generator means 34 which is selectively enabled in response to the mode state set in three stages of the four stage counter within the state logic counter 36. When the four stage counter in counter means 36 is in the dial computer state set by function button $F_1$, each shift of the seventeen stage shift register results in a strobe pulse being applied to the first ten AND gate set within the dial generator 28 until the appropriate number of decimal outputs are obtained and the seventeen stage shift register is reset by the last strobe pulse utilized. Similarly, when the four stage counter is in the dial referral agency state set by the function button $F_6$, each shift of the seventeen stage shift register results in a strobe pulse being applied to the second ten AND gate set within the dial generator 28 until the appropriate number of decimal outputs are obtained and the seventeen stage shift register is reset by the last strobe pulse relied upon. When, however, the four stage counter is in the send data state as initiated by the depression of function switch $F_5$, the initial first five shifts of the seventeen stage shift register in the state logic counter 36 results in the application of the initial five strobe pulses produced by the strobe generator 34 to the terminal address generator 29 through cable 60 whereupon five decimal location bits are applied to the multiplex means 26 through cable 58.

The operation of the exemplary structure of the point of sale terminal apparatus according to the present invention will be described in terms of the overall operation of the point of sale terminal apparatus within an integrated credit card sales system such as was outlined in conjunction with the flow diagram of FIG. 2. Once the clerk has properly set the card type switch $A_1$, the amount switches $A_2-A_8$, energized the system and loaded the credit card and annotated credit sales form in the imprinter 38 and credit card reader 30 combination, as aforesaid, and assuming the remote computer is to be contacted; the clerk will lift handset 2 and depress function switch $F_1$. This sets the four stage counter in the state logic counter 36 in the dial computer state and the seventeen stage shift register begins shifting under the influence of a clock. The state levels of the four stage counter and the parallel output levels of the seventeen stage shift register are applied to strobe generator means 34 through cable 72. The strobe generator means 34 produces a strobe pulse from each shift pulse produced and applies such strobe pulses to the multiplex means 26 and the first 10 AND gate set in the dial generator 28 as aforesaid. If it is assumed that an eleven number sequence (area code and local number and one access bit) is required to establish a link to the remote computer, the first eleven strobe pulses received through cable 56 will result in the application by the first ten AND gate set of an eleven digit decimal code on the ten conductor cable 54. This eleven digit decimal code is applied to the multiplex means 26 at the same digit rate as the strobe pulses are being generated which is the same rate as the seventeen stage shift register is being shifted. At the same time strobe pulses from the strobe generator means 34 are applied through conductor 52 to cause the gate dial arrangement therein to accept decimal data applied on cable 54 from the dial generator 28 and apply the same in decimal form to encoder means 24 through the 10 conductor cable 50.

As each decimal digit is received by the 2 of 7 encoder means 24, the decimal digit is encoded by the NAND gate array therein into a two frequence touchtone code corresponding to the decimal value received. The two frequency code produced by the encoder means 24 is applied through cable 48 to the relay array in the telephone interface 22 and the appropriate relay associated therewith is closed. As the relay array parallels the contacts of the touch-tone pad 6, the decimal digit initially generated by the dial generator 28 produces the same result as if a corresponding decimal button on the touch-tone pad 6 was depressed, as aforesaid, and a touch-tone frequency pair corresponding thereto is generated at the generator portion of the touch-tone pad 6 and applied to the telephone line through the telephone network 40, the telephone interface 22 and the isolation coupling 42. This continues until all eleven decimal digits have been generated by the dial generator means 28 and eleven touch-tone frequency pairs have been applied to the telephone line to thereby affect automatic dialing of the central computer location and access thereto.

The last of the eleven digits in decimal form generated by the dial generator 28, not only results in a generation of a touch-tone frequency pair corresponding thereto in the foregoing manner but also results in a resetting of the seventeen stage shift register, in this case, after only eleven shift cycles. Thereafter, the point of sale terminal apparatus remains in a standby mode until a communication link is completed to the computer through the telephone line. The remote computer station may indicate that it has gotten on the line by either an answer tone from the MODEM thereat or by sending an answering character in the form of a touch-tone pair. This answering tone, such as 2025 cycles, may be detected by a conventional tuned circuit detector in the telephone interface 22 and an indication of such detection applied through conductor 46 to shift the condition of the four stage counter to the send data state and thereby cause the illumination of function button $F_5$. Although the foregoing explanation was devoted to the operation of the instant invention when the automatic dial computer mode is rendered operative, it will be appreciated that the same operation results for the dial referral agency mode except that this mode is set in the four stage counter of the state logic counter 36 resulting in the application of strobe pulses to the second ten AND gate set in the dial generator 28 and the derivation of decimal digits therefrom.

When the send data function button $F_5$ is illuminated by the response of the remote computer as aforesaid, the clerk depresses function button $F_5$ whereupon the 17 stage shift register begins to shift under the influence of a clock and the four bit counter is in the send data state. The strobe generator means 34 applies the first five pulses produced thereby, corresponding to the first five shifts of the seventeen stage shift register, to the terminal address generator means 29 as aforesad. As each of the five strobe pulses is received by the terminal address generator means 29, the program card for the terminal will generate a decimal digit on one of the 10 conductors in cable 58 representative of the identification code for that terminal. The first five strobe pulses produced by the strobe generator means 34 places the gated dial thereof into a condition to apply the five decimal signals received from the terminal address generator means 29 on the 10 conductor output cable 50 thereof whereupon they are applied to the encoder means 24 and subsequently converted into two tone touch-tone frequencies which are then applied to telephone line in the same manner as the decimal digits signals produced by the dial generator 28.

As the 17 stage shift register in the state logic counter 36 completes shifting through the first five stages thereof in the send data mode, the 17 stage shift register is stopped and the output of the multiplex means 26 is stepped to receive data from the ten conductor cable 62 due to the action of the strobe pulse generator means 34. Assuming that, a credit card having a magnetic stripe is present as indicated by the setting of card switch $A_1$, the output level of the appropriate stage of the seventeen stage shift register is applied as a control level to conductor 64 whereupon the data representative of the credit card account, as stored on the card, is applied in decimal digit form through ten conductor cable 62, the multiplex means 26 and the output cable therefor at a rate determined by the reader 30 and encoded into two tone touch-tone frequencies which are applied to the telephone lines in the same manner mentioned above. If, however, the credit card reader 30 does not detect a start of data bit, the setting of switch $A_1$ indicates a non-embossed card or the clerk has noticed an absence of a magnetic stripe and depressed function button $F_3$; the enter card number function button $F_3$ is illuminated and the touch-tone pad 6 enabled. The clerk must then punch appropriate account numbers from the credit card in at the the touch-tone pad 6 where they are directly encoded and applied to the telphone for forwarding to the central computer. Once the credit card reader 30 has completed reading and the interlock on the state logic counter released, or the function button $F_3$ is extinguished, the seventeen stage shift register within the state logic counter 36 may again start shifting under the influence of an external clock. When the shift register again starts shifting, the single decimal input from the card type function switch is applied to the encoder and sent as a touch-tone transmission to the remote computer. Similarly, as the 17 stage shift register shifts through stages seven through 13, the seven characters of amount information set on switches $A_2$-$A_8$ are read, encoded and applied to the line, followed by the reading of the three transaction characters in the imprinter 38 as the shift register shifts through stages 14 through 16. Finally, as the seventeen stage shift register shifts to its 17 stage, the ring counter connection of the 16 stage, as aforesaid, resets the register while the 17 stage applies on end of message character (EOM) to the line.

When the end of message character is received, the computer either approves the sale or refers it to a referral agent. If the sale is approved, an authorization or touch-tone imprint code, for instance, 852 and 1633 cps, is sent. This signal when received by the terminal is detected in the telephone interface 22 by a conventional tuned circuit detector, as aforesaid, and a signal representative thereof is applied to the state logic counter 36 through cable 46. In response thereto, the four stage counter in the state logic counter 36 shifts to its imprint mode whereupon the print indicator function button is illuminated and the imprinter 38 receives a control (cont) imprint level. The receipt of the imprint control level at the imprinter, activates the roller bar thereby imprinting the sales form and interlocking the state logic counter 36 until such authorized imprinting is completed. Thereafter the computer disconnects and the imprinter drums are released whereby the point of sale terminal apparatus is ready for a new cycle of operation.

If the computer may not authorize the sale, it transmits a referral touch-tone pair, such as 770 and 1633, and patches the connection to the inquiring point of sale terminal to a referral agent. The referral touch-tone pair is detected in the telephone interface 22 and applied to the state logic counter 36 where it places the four stage counter in the referral mode and lights the referral indicator $F_6$. The clerk then may pick up the handset and speak with referral agent for any of the reasons detailed above. Thereafter, the referral agent may cause an imprint command to be transmitted whereby authorized mode imprinting takes place in the above described manner or he may deny the sale by disconnecting. At any time the handset 2 is in its cradle 2, the clerk may cause imprinting in the manual or override mode by the depression of function button $F_8$. This, however, not only causes imprinting, as aforesaid, but through the action of a relay causes the authorized print drum to flip to its unauthorized character whereby the sales form imprinted is clearly indicated as being unauthorized by the credit service and hence should a loss occur it must be born by the terminal site.

Thus it is seen that the present invention provides point of sale terminal apparatus which minimizes computer and sales personnel time due to the rapid manner in which data is clocked therethrough and the self-teaching features which characterizes its mode of operation. Furthermore, while providing for the rapid consummation of authorized sales on the basis of updated account information, contingency conditions are provided for by treating a wide variety of credit cards, providing independent access to computer stations and referral agents and establishing a manual override mode of operation.

Although the present invention has been disclosed with a rather specific exemplary embodiment thereof, many modifications and alternatives to such specifically described embodiment will be readily apparent to those of ordinary skill in the art. For instance, system cost may be reduced by deleting the powered imprinter and providing indicia in place thereof to indicate when authorization has been obtained. Conversely, the point of sale terminal apparatus disclosed herein may be made more extensive by including validating apparatus such as disclosed in U.S. application, Ser. No. 91,504, as filed on Nov. 20, 1970 therein. Additionally, larger shift registers and more extensive address information may be added to extend the system or provide more data and this may be done without extensive cost because the system employed is on a decimal bais.

While the invention has been described in connection with an exemplary embodiment thereof, it will be understood that many modifications will be readily apparent to those of ordinary skill in the art; and this application is intended to cover any adaptations or variations thereof. Therefore, it is manifestly intended that

What is claimed is:

1. Terminal apparatus for communicating with remotely located central locations over communications links comprising:
   multiplex means having a plurality of inputs and a single output, said multiplex means selectively connecting each of said plurality of inputs to said single output in a sequential manner and at a rate determined by timing pulses applied thereto, each of said plurality of inputs accepting a decimally coded input and said single output adapted to provide a decimally coded output signal;
   means for providing timing pulses to said multiplex means;
   means for providing a decimally coded input signal representing information to be communicated to each of said plurality of inputs of said multiplex means;
   means for encoding decimally coded outputs from said single output into a two out of seven Touch-Tone code; and
   means for applying said encoded outputs to a communication link.

2. The terminal apparatus according to claim 1 wherein said means for applying said encoded outputs to a communication link comprises;
   touch-tone pad and generator means;
   telephone network means for receiving signals from such Touch-Tone pad and generating means and applying said signals to said communications link; and
   interface means including a relay array, each relay in said array being connected in parallel with contacts on said touch-tone pad, said interface means receiving two out of seven touch-tone codes from said encoder means and being selectively enabled in response thereto to actuate appropriate ones of said generator means in said touch-tone pad and generator means.

3. The terminal apparatus according to claim 2 wherein said means for providing timing pulses to said multiplex means comprises:
   pulse generator means for applying a timing pulse to said multiplex means in response to each control level applied thereto; and
   counter means for applying control levels to said pulse generator means at a predetermined clocking rate.

4. The terminal apparatus according to claim 3 wherein said means for providing a decimally coded input signal to each of said plurality of inputs of said multiplex means includes first means for applying a multi-digit decimal code to one of said plurality of inputs of said multiplex means, each digit in said multi-digit decimal code being applied at a rate determined by the rate at which control levels are applied by said counter means to said pulse generator means.

5. The terminal apparatus according to claim 4 wherein said counter means includes multi-state means for producing said control levels and multi-condition indicating means for controlling the state of said terminal means.

6. The terminal apparatus according to claim 5 wherein said means for providing a decimally coded input signal to each of said plurality of inputs of said multiplex means additionally includes second means for applying a multi-digit decimal code to another of said plurality of inputs of said multiplex means, said multiplex means applying the multi-digit decimal codes applied thereto by said first and second means to the single output thereof only when said multi-condition indicating means is in one condition, said multi-digit decimal code applied thereto by said first means being connected to the single output of said multiplex means when certain ones of said control levels are produced by said multi-state means and said multi-digit decimal code applied thereto by said second means being connected to the single output of said multiplex means when certain other ones of said control level are produced by said multi-state means.

7. The terminal apparatus according to claim 6 additionally comprising:
   means for detecting an authorizing signal on said communications link and producing a predetermined signal in response thereto;
   means responsive to said predetermined signal to change the condition of said multi-condition indicating means from one condition to a second condition; and
   means for indicating at said terminal apparatus that said multi-condition indicating means is in said second condition.

8. The terminal apparatus according to claim 7 wherein said means for indicating at said terminal apparatus that said multi-condition indicating means is in said second condition comprises powered imprinter means, said powered imprinter means being energized as an indication of said second condition.

9. The terminal apparatus according to claim 8 additionally comprising credit card reader means for applying a multi-digit decimal code to a further one of said plurality of inputs to said multiplex means when said multi-condition indicating means is in said one condition, said credit card reader means being operative for appropriately encoded credit cards while said touch-tone pad means directly communicates credit card information to said communications link in the absence of a properly encoded credit card.

10. The terminal apparatus according to claim 9 wherein said means for providing a decimally coded input signal to each of said plurality of inputs of said multiplex means additionally comprises dial generator means for applying a multi-digit decimal code to a predetermined input of said plurality of inputs of said multiplex means, each digit in said last mentioned multi-digit decimal code being applied at a rate determined by the rate at which control levels are applied by said counter means, said dial generator means being operative to produce said multi-digit decimal code only when said multi-condition indicating means is in a third condition.

11. The terminal apparatus according to claim 1 wherein said means for providing timing pulses to said multiplex means comprises:
   pulse generator means for applying a timing pulse to said multiplex means in response to each control level applied thereto; and
   counter means for applying control levels to said pulse generator means at a predetermined clocking rate.

12. The terminal apparatus according to claim 11 wherein said means for providing a decimally coded input signal to each of said plurality of inputs of said multiplex means includes first means for applying a multi-digit decimal code to one of said plurality of inputs of said multiplex means, each digit in said multi-digit decimal code being applied at a rate determined by the rate at which control levels are applied by said counter means to said pulse generator means.

13. The terminal apparatus according to claim 12 wherein said counter means includes multi-state means for producing said control levels and multi-condition indicating means for controlling the state of said terminal means.

14. The terminal apparatus according to claim 13 wherein said means for providing a decimally coded input signal to each of said plurality of inputs of said multiplex means additionally includes second means for applying a multi-digit decimal code to another of said pulrality of inputs of said multiplex means, said multiplex means applying the multi-digit decimal codes applied thereto by said first and second means to the single output thereof only when said multi-condition indicating means is in one condition, said multi-digit decimal code applied thereto by said first means being connected to the single output of said multiplex means when certain ones of said control levels are produced by said multi-state means and said multi-digit decimal code applied thereto by said second means being connected to the single output of said multiplex means when certain other ones of said control level are produced by said multi-state means.

15. The terminal apparatus according to claim 14 wherein said means for providing a decimally coded input signal to each of said plurality of inputs of said multiplex means additionally comprises dial generator means for applying a multi-digit decimal code to a predetermined input of said plurality of inputs of said multiplex means, each digit in said last mentioned multi-digit decimal code being applied at a rate determined by the rate at which control levels are applied by said counter means, said dial generator means being operative to produce said multi-digit decimal code only when said multi-condition indicating means is in a third condition.

16. The terminal apparatus according to claim 15 additionally comprising:
means for detecting an authorizing signal on said communications link and producing a predetermined signal in response thereto;
means responsive to said predetermined signal to change the condition of said multi-condition indicating means from one condition to a second condition; and
means for indicating at said terminal apparatus that said multi-condition indicating means is in said second condition.

17. The terminal apparatus according to claim 16 wherein said means for indicating at said terminal apparatus that said multi-condition indicating means is in said second condition comprises powered imprinter means, said powered imprinter means being energized as an indication of said second condition.

18. The terminal apparatus according to claim 17 additionally comprising credit card reader means for applying a multi-digit decimal code to a further one of said plurality of inputs to said multiplex means when said multi-condition indicating means is in said one condition, said credit card reader means being operative for appropriately encoded credit cards while said touch-tone pad means directly communicates credit card information to said communications link in the absence of a properly encoded credit card.

19. The terminal apparatus according to claim 5 additionally comprising:
means for detecting an authorizing signal on said communications link and producing a predetermined signal in response thereto;
means responsive to said predetermined signal to change the condition of said multi-condition indicating means from one condition to a second condition; and
means for indicating at said terminal apparatus that said multi-condition indicating means is in said second condition.

20. The terminal apparatus according to claim 19 wherein said means for indicating at said terminal apparatus that said multi-condition indicating means is in said second condition comprises powered imprinter means, said powered imprinter means being energized as an indication of said second condition.

21. The terminal apparatus according to claim 5 additionally comprising credit card reader means for applying a multi-digit decimal code to a further one of said plurality of inputs to said multiplex means when said multi-condition indicating means is in said one condition, said credit card reader means being operative for appropriately encoded credit cards.

22. Terminal apparatus for communicating with remotely located central locations over communications links comprising:
multiplex means having a plurality of inputs and a single output, said multiplex means selectively connecting each of said plurality of inputs to said single output in a sequential manner and at a rate determined by timing pulses applied thereto, each of said plurality of inputs accepting a coded input and said single output adapted to provide a coded output signal;
means for providing timing pulses to said multiplex means;
means for providing a coded input signal representing information to be communicated to each of said plurality of inputs of said multiplex means;
means for further encoding coded outputs from said single output into a two out of seven Touch-Tone code; and
means for applying said encoded outputs to a communication link.

* * * * *